Patented Nov. 6, 1928.

1,690,620

UNITED STATES PATENT OFFICE.

HANS T. CLARKE AND CARL J. MALM, OF ROCHESTER, NEW YORK, ASSIGNORS TO EASTMAN KODAK COMPANY, OF ROCHESTER, NEW YORK, A CORPORATION OF NEW YORK.

CELLULOSE ESTERS CONTAINING UNSATURATED ORGANIC ACID GROUPS.

No Drawing.   Application filed May 4, 1927. Serial No. 188,862.

This invention relates to cellulose esters containing unsaturated organic acid groups. One object of the invention is to provide esters containing such groups, whether they be the sole acyl groups in the ester or whether saturated acyl groups be present along with the unsaturated ones. Another object of the invention is to provide esters of this character which are soluble in useful organic neutral solvents, and yield transparent films, many of them highly flexible. Another object of the invention is to provide cellulose esters containing an unsaturated acyl group, in which substitutions may be readily made. Other objects will hereinafter appear.

So far as we are aware, cellulose esters of unsaturated organic acids have hitherto not been described, especially esters having useful solubilities in organic solvents. We have found that useful cellulose esters, having useful solubilities, may be prepared which contain an acyl group corresponding to a monocarboxylic unsaturated organic acid in which there is an ethylenic bond. We have also found that esters may be prepared in which the acyl groups consist solely of the unsaturated species, or part of the acyl groups may be unsaturated, and the rest saturated. Not only do these esters constitute useful film and varnish making materials, but they serve as extremely valuable intermediates in the manufacture of further compounds by attacking or substituting in the unsaturated acyl groups.

The unsaturated acyl groups which best serve our purposes are those in the series of acids beginning with acrylic and those which may be considered as derived from them by substitution, such as cinnamic acid. Of the acids in the series beginning with acrylic, crotonic and undecylenic are representatives of the lower and higher members, and will be used, therefore, in the following illustrations; but it will be understood that our invention is not limited to these illustrative compounds, except as indicated in the appended claims.

In one example of our invention 3 parts by weight of cotton tissue paper, such as is used in the manufacture of cellulose acetate, is added to a mixture of 15 parts by weight of cinnamic acid, 40 parts by weight of chloro-acetic anhydrid and .05 parts by weight of magnesium perchlorate. The thoroughly mixed reaction mass is then warmed at 60 to 65° C. until the fibers disappear and a more or less clear dope is obtained. This may take say about 5 hours. From the reaction mass the cellulose cinnamate is obtained by precipitation in methyl alcohol, and washing with the same. The product is soluble in chloroform and from its solution yields transparent films or varnish layers.

In another example, 5 parts by weight of the above mentioned tissue paper is added to a mixture of 15 parts by weight of crotonic acid, 30 parts by weight of chloroacetic anhydrid and .05 parts by weight of magnesium perchlorate. The thoroughly mixed reaction mass is kept at 60 to 65° C. until the fibers largely disappear, and a more or less clear dope is obtained. This generally occurs in about 5 hours. The cellulose crotonate is obtained from the reaction mass by precipitation with a 50% aqueous methyl alcohol solution, and washed with the same liquid. The product, when dried, is soluble in acetone, chloroform, benzol, or mixtures of these. Its solutions yield transparent films.

In still another illustration of our invention 10 parts by weight of tissue paper of the above kind is added to a mixture of 40 parts by weight of crotonic acid, 30 parts by weight of acetic anhydrid, 30 parts of chloroacetic acid and 0.1 part by weight of magnesium perchlorate. The thoroughly mixed reaction mass is kept at 60 to 65° C. until the fibers disappear and a dope is obtained. The latter is precipitated into methyl alcohol, and the ester washed with this liquid. The cellulose acetocrotonate is soluble in either chloroform or acetone, or mixtures of them, and when its solutions are spread and evaporated, colloidized films are obtained which are transparent and flexible.

The relative proportions of the esterifying baths may be varied to obtain products having different proportions of saturated and unsaturated acyl groups. For example, when it is desired to increase the amount of acetic acid groups, and lower the amount of crotonic groups, the procedure may, for instance, be as follows: 5 parts by weight of clean cotton cellulose, preferably in the form of tissue paper, is added to a mixture of 12 parts by weight of crotonic acid, 15 parts by weight of acetic anhydrid, 15 parts by weight of chloroacetic acid, and .05 parts by weight of magnesium perchlorate. The mixture is kept at 60 to 65° C. until a fairly clear dope is obtained by the disappearance of the cotton fibers. This often takes about 5 or 6 hours. The ester is recovered from the reaction mass by precipitation in 50% aqueous methyl alcohol and the product washed with this liquid. The product is soluble in either chloroform, or acetone, or mixtures of them. From its solutions it gives transparent, colloidized, flexible films.

In still another example of our invention 5 parts by weight of the special tissue paper hereinabove mentioned are added to a mixture of 15 parts by weight of crotonic acid, 15 parts by weight of acetic anhydrid, and 0.2 parts by weight of copper perchlorate, and 22 parts by weight of chloroform. The mixture is warmed at 60 to 65° C. until a dope is obtained, say in about 28 hours. The cellulose aceto-crotonate is recovered from the mass by precipitation with methyl alcohol, washing with the same liquid and drying. It is soluble in either chloroform or acetone, or mixtures of them, and yields from such solutions films or varnish layers which are transparent and flexible.

In another form of our invention 20 parts by weight of rayon fibers prepared by the cuprammonium process are placed in a mixture of 300 parts by weight of crotonic acid and 50 parts by weight of chlorobenzene. The mixture is heated for 48 hours at 155 to 157° C. During this period the chlorobenzene may be distilled off, at intervals and replaced by further dry chlorobenzene. This removes the water which is present or formed during the reaction. The rayon fibers which are now lower cellulosic esters of crotonic acid, are filtered off from the other ingredients and washed with methyl alcohol. 5 parts by weight of these prepared fibers are then added to a mixture of 30 parts by weight of acetic acid, 20 parts by weight of acetic anhydrid and 1 part by weight of zinc chlorid and the mixture warmed at 60 to 65° C. until a homogeneous dope is obtained. From this reaction mixture the cellulose aceto-crotonate is obtained by precipitation with water and washing with water or methyl alcohol. The product is soluble in chloroform or acetone, or mixtures of them and yields flexible, transparent films or varnish layers.

In still a further form of our invention 20 parts by weight of long fibered cotton is mercerized for 48 hours at room temperature in an 18% aqueous sodium hydroxide solution. At the end of this period it is washed free from alkali with water and then the water is removed by washing with a mixture of substantially anhydrous alcohol and ether. Finally it is dried in the air. The mercerized fibers with the specially conditioned surfaces, thus produced, are next heated in a boiling mixture of 500 parts by weight of crotonic acid and 100 parts by weight of chlorobenzene, the temperature being at about 155 to 157° C. The water liberated by the esterification reaction is periodically removed by distillation, the chlorobenzene which distills off, being replaced with dry chlorobenzene. After 48 hours of this treatment the fibers contain considerable amounts of crotonic groups esterified onto the cellulose, although in this condition, of course, the esterification has not been carried far enough to produce useful solubility. The lower cellulose crotonates, thus formed, are then acetated. For example, 5 parts by weight of them are treated in a mixture of 15 parts by weight of acetic anhydrid, 20 parts by weight of acetic acid, and 0.1 part by weight of magnesium perchlorate. The reaction is conducted at 60 to 65° C. and the cellulose aceto-crotonate, thus produced, isolated by precipitating and washing, as described above. The product is soluble in chloroform, and yields transparent films. The proportion of crotonic groups in the ester may be increased by carrying the boiling of the mercerized fibers in the crotonic acid-chlorobenzene mixture for 96 hours. This gives a product containing more crotonic groups, and consequently when such lower cellulose crotonates are acetated, as above described, the percentage of unsaturated groups in the molecule is increased, relative to the saturated acetyl groups. The product thus obtained is soluble in either acetone or chloroform or mixtures of them.

Instead of mixed esters containing groups from the lower fatty acids, such as acetic acid, we may introduce saturated groups from the higher fatty acids. For example, 4 parts by weight of cotton tissue paper, of the type described above, are mixed into 30 parts by weight of commercial stearic acid, 9 parts by weight of crotonic acid, 50 parts by weight of chloroacetic anhydrid, and 0.1 part by weight of magnesium perchlorate. This is heated at 60 to 65° C. until a homogeneous dope is obtained, say in about 20 hours. This dope is poured into methyl alcohol to precipitate the cellulose crotono-stearate, and the product is washed with warm methyl alcohol and dried. It is soluble in chloroform, acetone, benzol, or mixtures of these. From its solutions it yields transparent colloidized films of exceptional flexibility.

In still another illustration of our invention 5 parts by weight of tissue paper, of the kind described above, are stirred into a mixture of 15 parts by weight of undecylenic acid, 25 parts by weight of chloroacetic acid, 15 parts by weight of acetic anhydrid, and .05 parts by weight of magnesium perchlorate trihydrate. The reaction mass is then kept at 60 to 65° C. until a homogeneous dope is obtained, say in about 6 hours. This dope is treated with methyl alcohol to precipitate the cellulose aceto-undecylenate. The product is soluble in either chloroform or acetone, or mixtures of them.

While in the above examples, in which mixed esters are produced, we have mentioned only acetic groups and stearic groups from the fatty acid series, it will be understood that groups corresponding to any of the other acids of the fatty acid monocarboxylic series may likewise be employed.

It is interesting to note that mixed esters having approximately 12 acyl groups for every 24 carbon atoms in the cellulose, become acetone soluble when at least one and one-half of the acyl groups are crotonic and the rest acetic; or when slightly more than one-half a group is undecylenic and the rest acetic. In general it will be seen that the number of unsaturated groups on such a basis is obtained by dividing six by the number of carbon atoms in the unsaturated acid.

Our novel unsaturated esters may be mixed with other cellulose esters which are soluble in the same solvents, such as cellulose acetate and/or cellulose nitrate, either with or without plasticizers. Thus films may be prepared from such dissolved mixtures. Layers of our unsaturated esters may likewise be combined with layers of the cellulose esters or ethers in laminated films or other products, a common solvent being present to promote the adherence of the layers in accordance with customary laminating practice. For example, a film of our unsaturated esters may have a very thin layer of somewhat hygroscopic cellulose acetate on its rear face,— that is, the face opposite the one which receives the photographic emulsion.

In plastic or flowable compositions in which our unsaturated esters form an essential constituent, there may also be present any of the substances of low volatility commonly colloidized with cellulose acetate in its known compositions, a suitable amount of a common solvent, such as acetone, chloroform, or benzol, or mixtures of them being used. Moreover, the proportions may be approximately the same as those heretofore employed in connection with cellulose acetate.

Our unsaturated esters may be used in making any of the things hitherto made by employing the previously known cellulose esters. An incomplete but suggestive list of such uses includes molded articles, varnishes and lacquers, coatings for artificial leather, coatings for fabrics, rayon, and photographic films.

Having thus described our invention, what we claim as new and desire to secure by Letters Patent is:

1. An organic ester containing a cellulose group esterified with an acyl group corresponding to a monocarboxylic organic acid in which there is an ethylenic bond.

2. A cellulose ester in which a cellulose group is esterified with a group corresponding to an acid of the acrylic series.

3. A cellulose ester in which a cellulose group is esterified with a crotonic group.

4. A mixed organic ester of cellulose in which a cellulose group is esterified with both a fatty acid group and an acyl group corresponding to a monocarboxylic organic acid in which there is an ethylenic bond.

5. A mixed organic ester of cellulose in which a cellulose group is esterified with both a fatty acid group and an acyl group corresponding to an acid of the acrylic series.

6. Cellulose crotono-stearate.

Signed at Rochester, New York, this 27th day of April, 1927.

HANS T. CLARKE.
CARL J. MALM.